(12) United States Patent
Berteig

(10) Patent No.: US 6,348,936 B1
(45) Date of Patent: Feb. 19, 2002

(54) METHOD AND APPARATUS FOR GRAPHICAL SELECTION OF DATA

(75) Inventor: Mishkin Berteig, Toronto (CA)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/086,148

(22) Filed: May 28, 1998

(51) Int. Cl.⁷ .................................. G09G 5/00
(52) U.S. Cl. .................... 345/856; 345/784; 345/802
(58) Field of Search .................. 345/123, 124, 345/125, 341, 973, 974, 784, 802, 833, 856, 862, 785, 786, 787, 684, 686, 687

(56) References Cited

U.S. PATENT DOCUMENTS

| | | | |
|---|---|---|---|
| 4,937,439 A | | 6/1990 | Fahnlander et al. |
| 5,263,134 A | * | 11/1993 | Paal et al. ............ 345/341 |
| 5,485,174 A | * | 1/1996 | Henshaw et al. ........ 345/123 |
| 5,581,275 A | * | 12/1996 | Glei et al. ............ 345/123 |
| 5,613,056 A | * | 3/1997 | Gasper et al. ......... 345/173 |
| 5,680,561 A | * | 10/1997 | Amro et al. .......... 345/341 |
| 5,784,498 A | * | 7/1998 | Venable ............... 382/254 |
| 5,838,320 A | * | 11/1998 | Matthew, III et al. ... 345/341 |
| 5,956,025 A | * | 9/1999 | Goulden et al. ........ 345/341 |
| 5,974,194 A | * | 10/1999 | Hireni et al. .......... 382/262 |
| 6,014,140 A | * | 1/2000 | Strand ................. 345/341 |

FOREIGN PATENT DOCUMENTS

| EP | 0384879 | 8/1990 |
|---|---|---|
| WO | WO 005972 | 5/1990 |

OTHER PUBLICATIONS

"Range Selection Slilder Control" IBM Technical Disclosure Bulletin, vol. 36, No. 9B, Sep. 1, 1993, p. 277/278, XP000397151 ISSN: 0018–8689.

"Choice Slider" IBM Technical Disclosure Bulletin, vol. 38, No. 11, Nov. 1, 1995, p. 319, XP000547371 ISSN: 0018–8689.

"Valueset Visual" IBM Technical Disclosure Bulletin, vol. 34, No. 12, May 1, 1992, pp. 119–120, XP000308455 ISSN: 0018–8689.

Patent Abstract of Japan vol. 097, No. 011, Nov. 28, 1997 & JP 09 190331 A (Canon, Inc.), Jul. 22, 1997 *abstract*.

* cited by examiner

*Primary Examiner*—Ba Huynh
(74) *Attorney, Agent, or Firm*—The Hecker Law Group

(57) ABSTRACT

The present invention comprises a method and apparatus for selecting data using a graphic object such as a slider that incorporates a display area for displaying information about the data that is selected. In an embodiment of the invention, an arbitrarily sized and shaped slider for selecting data from an arbitrarily sized and shaped graphical representation related to an underlying set of data are displayed on a display screen. Each position in the display screen occupied by the graphical representation correlates to particular data from the set of data represented the graphical representation. As the slider is moved relative to the display screen, information identifying the data corresponding to the current position of a reference datum of the slider is displayed in an information display area of the slider.

45 Claims, 5 Drawing Sheets

METHOD AND APPARATUS FOR GRAPHICAL SELECTION OF DATA

BACKGROUND OF THE INVENTION

1. Field of the Invention

The present invention relates to a method and apparatus for graphical selection of data.

2. Background Art

One way to manipulate data using a computer is through the use of graphical "tools" displayed on a computer display screen. One such tool is referred to as a "slider." As its name implies, a slider can be slid back and forth or up and down to help a user select certain data. A problem with existing sliders is a requirement to look at an area away from the slider tool itself to see the selected data. This problem can be understood by reviewing the operation of existing sliders.

FIG. 1 shows an example of a prior art computer user interface that features both a one-dimensional and a two dimensional slider. The user interface of FIG. 1 allows a user to select a color from among available colors. The user interface of FIG. 1 may be used, for example, in a painting or drawing program. A user interface that allows a user to select a color from an available spectrum of colors is sometimes referred to as a "color picker." As shown in FIG. 1, color picker 100 includes a color selection window 105 and a brightness selection bar 110. A two-dimensional color selection slider 120 in the form of a pair of cross hairs is displayed in color selection window 105. A one-dimensional brightness selection slider 115 in the form of a small triangle is displayed adjacent to brightness selection bar 110. To use the color picker of FIG. 1, a user selects a color from among those displayed in color selection window 105 by moving color selection slider 120 such that its center is over the desired color, for example using a pointing device such as a mouse. The resulting color selected by the user is shown below color selection window 105 in a separate color preview window 125. To select a color, a user must keep one eye on the position of color selection slider 120 and one eye on color preview window. This need to focus simultaneously on two different areas of a display screen is inconvenient and makes it difficult for a user to easily find a desired color.

After selecting a color in color selection window 105 the user can adjust the brightness of the selected color by moving brightness selection slider 115 up or down along brightness selection bar 110. The resulting color changes are again shown in color preview window 125. To change the brightness, the user must again keep one eye on the position of brightness selection slider 115 and one eye on color preview window 125. Again, the need to focus simultaneously on two disparate areas of the display screen is tedious and inconvenient.

FIG. 2 shows a second example of a user interface featuring a slider of the prior art. User interface 200 shown in FIG. 2 is an interface for a word processing program. Interface 200 features a one dimensional slider 210 that allows a user to scroll through a document displayed in document display window 215. Slider 210 allows a user to navigate through the document by dragging slider 210 vertically up or down along scroll bar 230. As slider 210 is moved, the page number 220 corresponding to the current vertical position of slider 210 relative to the top and bottom of scroll bar 230 is displayed at the bottom left of interface 200. To scroll to a desired page, a user must keep one eye on the position of slider 210 and one eye on the page number 220. Again, the need to focus on two spatially separate locations is tedious and inconvenient.

SUMMARY OF THE INVENTION

The present invention comprises a method and apparatus for selecting data using a slider that incorporates a display area for displaying information about the data that is selected.

In an embodiment of the invention, an arbitrarily sized and shaped slider for selecting data from an arbitrarily sized and shaped graphical data field that represents an underlying set of available data are displayed on a display screen. Each position in the data field correlates to particular data from the set of data represented by the data field. As the slider is moved relative to the data field, information identifying the data corresponding to the current position of a reference datum of the slider is displayed in an information display area of the slider.

In one embodiment, the invention comprises a two-dimensional slider displayed on a color palette. As the slider is moved, a display area of the slider displays the color corresponding to a current position of the slider with respect to the underlying color palette. As the slider moves around the palette, the color displayed on the slider changes in real time with the movement of the slider. At any time, the user can ascertain the currently selected color simply by looking at the slider. There is no need for the user to divide the user's attention between the slider being moved and a separately located display area.

In a second embodiment, the invention comprises a one dimensional slider displayed on a scroll bar of a document display window of a word processing program. As the slider is moved up or down the scroll bar, a page number corresponding to a page of a document displayed in the document display window is displayed in a display area of the slider. A user can easily scroll to a desired page by moving the slider until the desired page number is displayed in the slider's display area.

In a third embodiment, the invention comprises a one dimensional slider displayed on a line of varying line thickness. As the slider is moved along the line, a line segment whose thickness corresponds to the thickness of the line under the center of the slider is displayed in a display area of the slider.

DETAILED DESCRIPTION OF THE INVENTION

A method and apparatus for graphically selecting data is described. In the following description, numerous specific details are set forth to provide a thorough description of the invention. It will be apparent, however, to one skilled in the art that the invention may be practiced without these specific details. In other instances, well-known features have not been described in detail so as not to obscure the invention.

Figure 6:
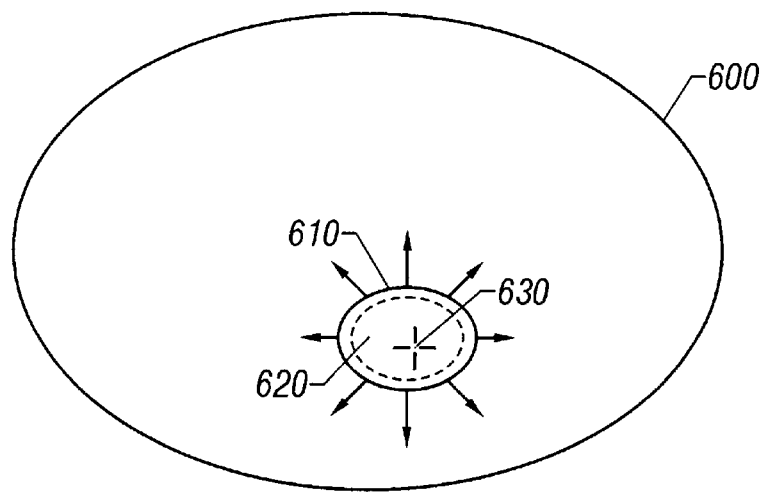
FIG. 6 shows an example of an embodiment of the invention.

FIG. 6 shows an example of an embodiment of the invention that can be used to select any arbitrary data from a set of available data. FIG. 6 shows a data field 600, and a slider 610, that may be displayed on a display screen according to the invention. Data field 600, which may be of arbitrary size and shape, constitutes a graphical representation of an underlying set of available data. Data field 600 may display representations of the available data (such as, for example, colors of a color palette or lines of varying thickness), data field 600 may be essentially blank (as, for example, when data field 600 is in the form of a scroll bar), data field 600 may be wholly or partially invisible, or data field 600 may display any other desired data or image. Each position in data field 600, and each corresponding position on the display screen, corresponds to some particular data from the underlying set of data represented by data field 600.

Slider 610 is a graphical object that may be of arbitrary size and shape. Slider 610 comprises a display area 620 and a reference datum 630. Display area 620 may be of any desired size and shape, and need not necessarily fall within the bounds of slider 610. Reference datum 630 may a point, line, or other datum located at a known position relative to slider 610 such that as slider 610 moves, reference datum 630 moves in a known manner. For example, in one or more embodiments, reference datum 630 is located at a fixed location relative to slider 610 such that when slider 610 is moved, reference datum 630 moves in the same manner. Reference datum 630 may be located within or without the bounds of slider 610, and may or not be displayed in a visible manner on the display screen.

Slider 610 is movable about the display screen such that reference datum 630 moves about the portion of the display screen that represents data field 600. As slider 610 is moved, information relating to the data corresponding to the position on the display screen at which reference datum 630 is at any time located is displayed in display area 620. For example, the information displayed in display area 620 may be color data, page number data, or line thickness data, or may be some other information that provides identifying information to a user about the data that is being selected from the set of data represented by data field 600. The user selects data by moving slider 610 about data field 600 until the desired data is identified by the information displayed in display area 620. Although slider display area 620 may be sized so that it physically covers a portion of data field 600 that corresponds to a range of selectable data, only information related to the selected data, namely the data corresponding to the location of reference datum 630, is displayed in display area 620.

Figure 1:
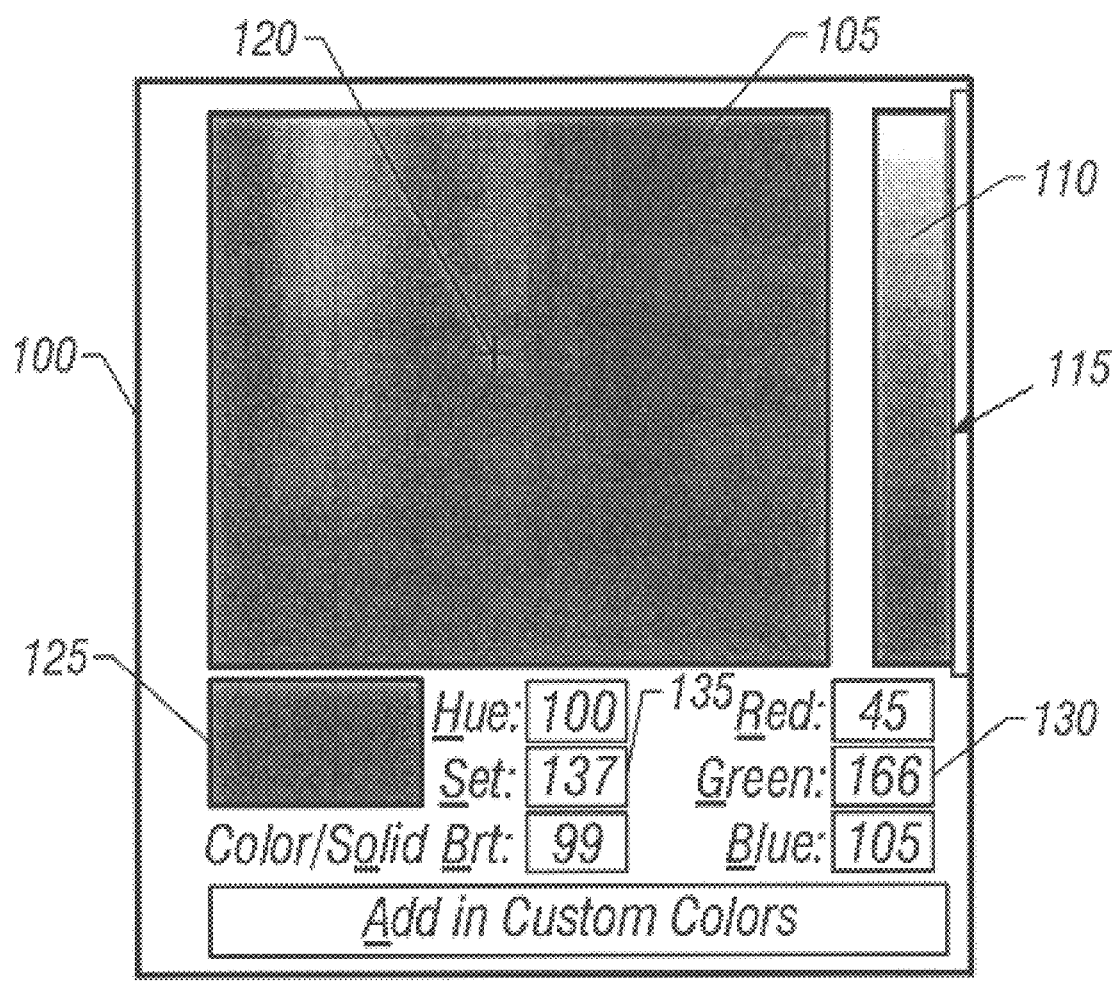
FIG. 1 shows an example of a prior art interface for selecting color data.
Figure 2:
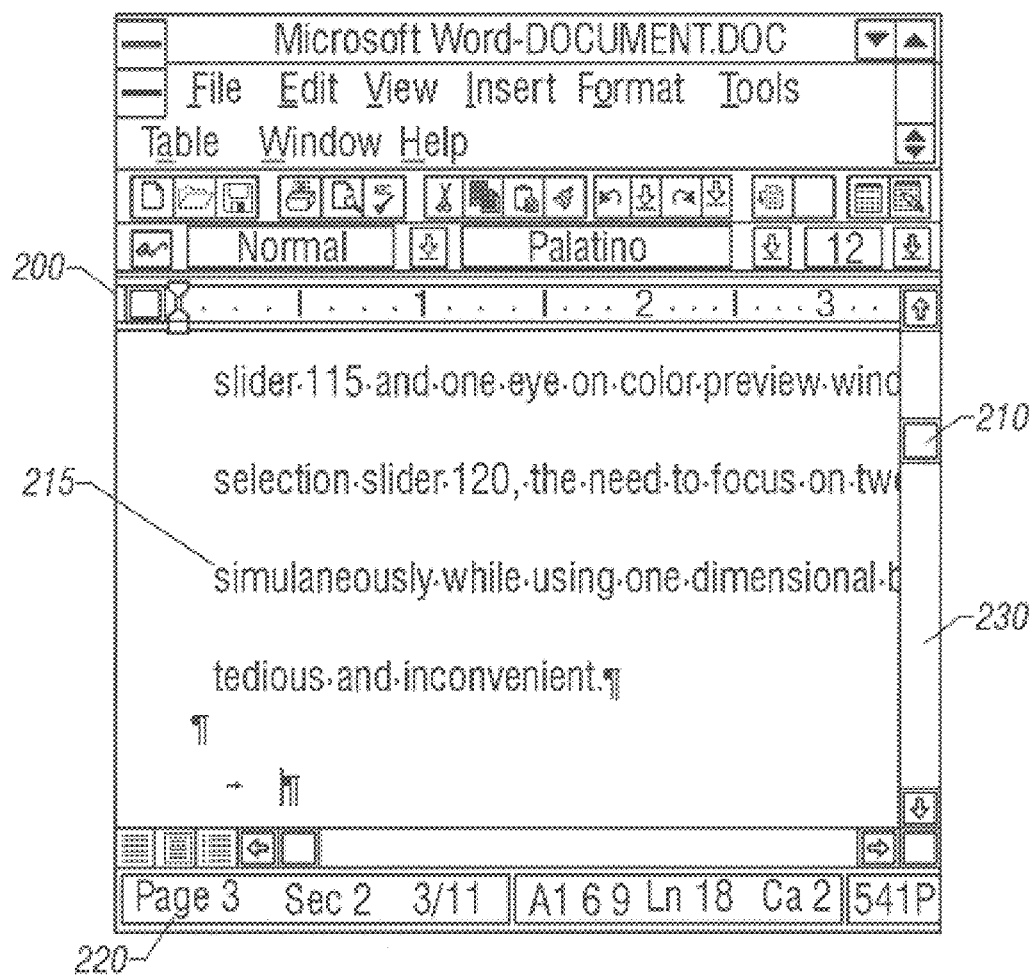
FIG. 2 shows an example of a prior art interface for selecting data representing a portion of a word processing document.
Figure 3:
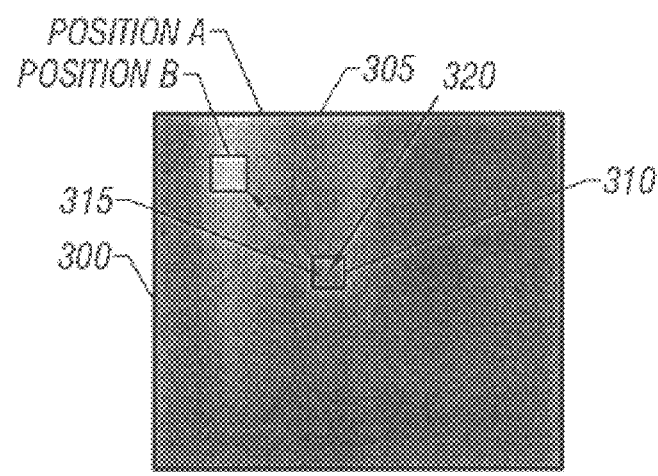
FIG. 3 shows an example of an embodiment of the invention used for selecting color data.

FIG. 3 shows an example of an embodiment of the invention that is used for selecting a color from a color palette. The embodiment of FIG. 3 may be used, for example, in a painting or drawing program. In the embodiment of FIG. 3, slider 310 is depicted in the form of a rectangular box displayed on color palette 305. The interior of slider 310 comprises a display area 315 that displays a swatch of the currently selected color. The currently selected color is the color in palette 305 that corresponds at any time to the current position of a reference datum, for example the center 320, of slider 310. As shown in FIG. 3, as slider 310 is moved from point "A" to point "B" the color displayed in display area 315 changes so that at any time display area 315 displays the color of the color point in palette 305 that falls directly under center 320 of slider 310. Since the currently selected color is displayed on the slider itself, and not in a separate preview window as in the prior art, the user a can easily identify the color that has been selected.

Figure 4:
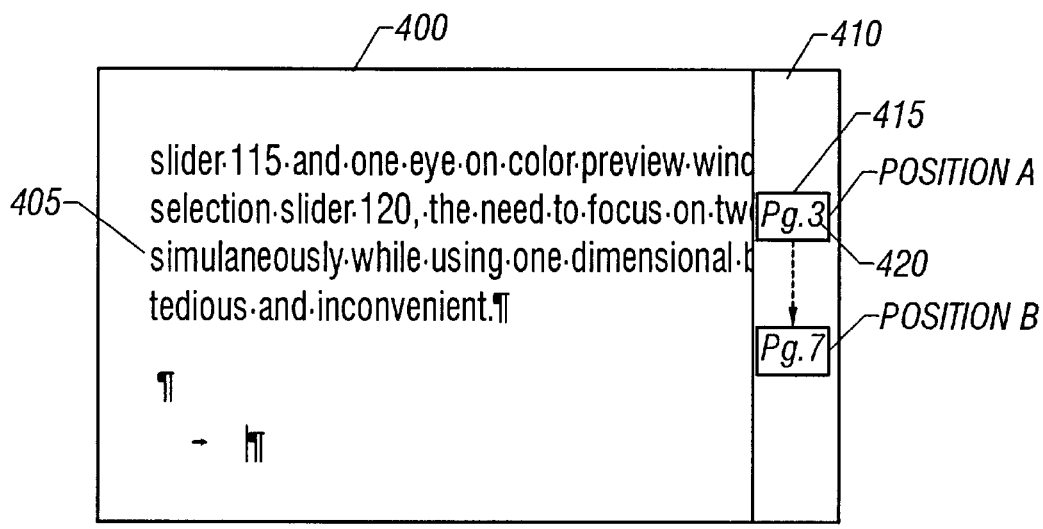
FIG. 4 shows an example of an embodiment of the invention used for selecting a page of a word processing document.

FIG. 4 shows an example of an embodiment of the invention that is used for scrolling through a document, as, for example, in a word processing program. In the embodiment of FIG. 4, slider 415 is displayed in the form of a rectangular box. Slider 415 is vertically movable up and down along scroll bar 410. The relative height of slider 415 relative to the top and bottom of scroll bar 410 corresponds to a relative page position within the word processing document displayed in document display window 405. The top of scroll bar 410 corresponds to the first page of the document, the bottom corresponds to the last page of the document, and intermediate positions correspond to intermediate pages of the document. Moving slider 415 to a particular position causes the page corresponding to that position to be displayed in display window 405.

Slider 415 comprises a display area 420 in which document navigation data is displayed. In the embodiment of FIG. 4, the document navigation data that is displayed is the page number of the document displayed in document display window 405 that corresponds to the relative position of slider 415 with respect to scroll bar 410. For example, for the document in the example of FIG. 4, position A corresponds to page 3 of the document and position B corresponds to page 7 of the document. Slider 415 allows a user to quickly scroll to a desired page by moving slider 415 up or down scroll bar 410 until the desired page number is displayed in display area 420. The corresponding page will then be displayed in document display window 405.

Figure 5:
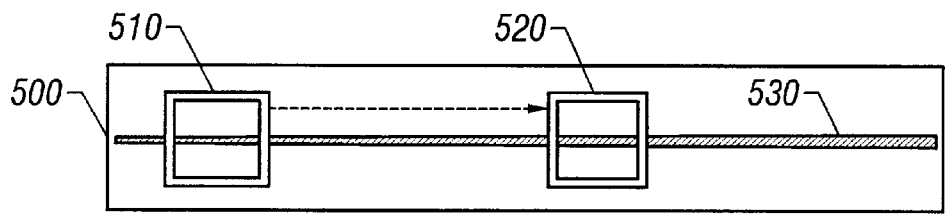
FIG. 5 shows an example of an embodiment of the invention used for selecting a line thickness.

FIG. 5 shows an example of an embodiment of the invention that can be used to select a line thickness, for example in a painting or drawing program. In the embodiment of FIG. 5, slider 510 is displayed over a line 530 having a varying line thickness. Slider 510 is movable along line 530 as shown in FIG. 5. As slider 510 moves along line 530, display area 520 displays a line segment 525 whose thickness is the thickness of line 530 at a reference datum, for example the center, of slider 510. Slider 510 thus allows a user to easily select a desired line thickness by moving slider 510 along line 530 until the line segment displayed in display area 520 of slider 510 has the desired line thickness.

It will be apparent to those skilled in the art that the size and shape of and the data selected by the slider of the invention is not limited to those described with respect to the embodiments of FIGS. 3–5.

Figure 7:
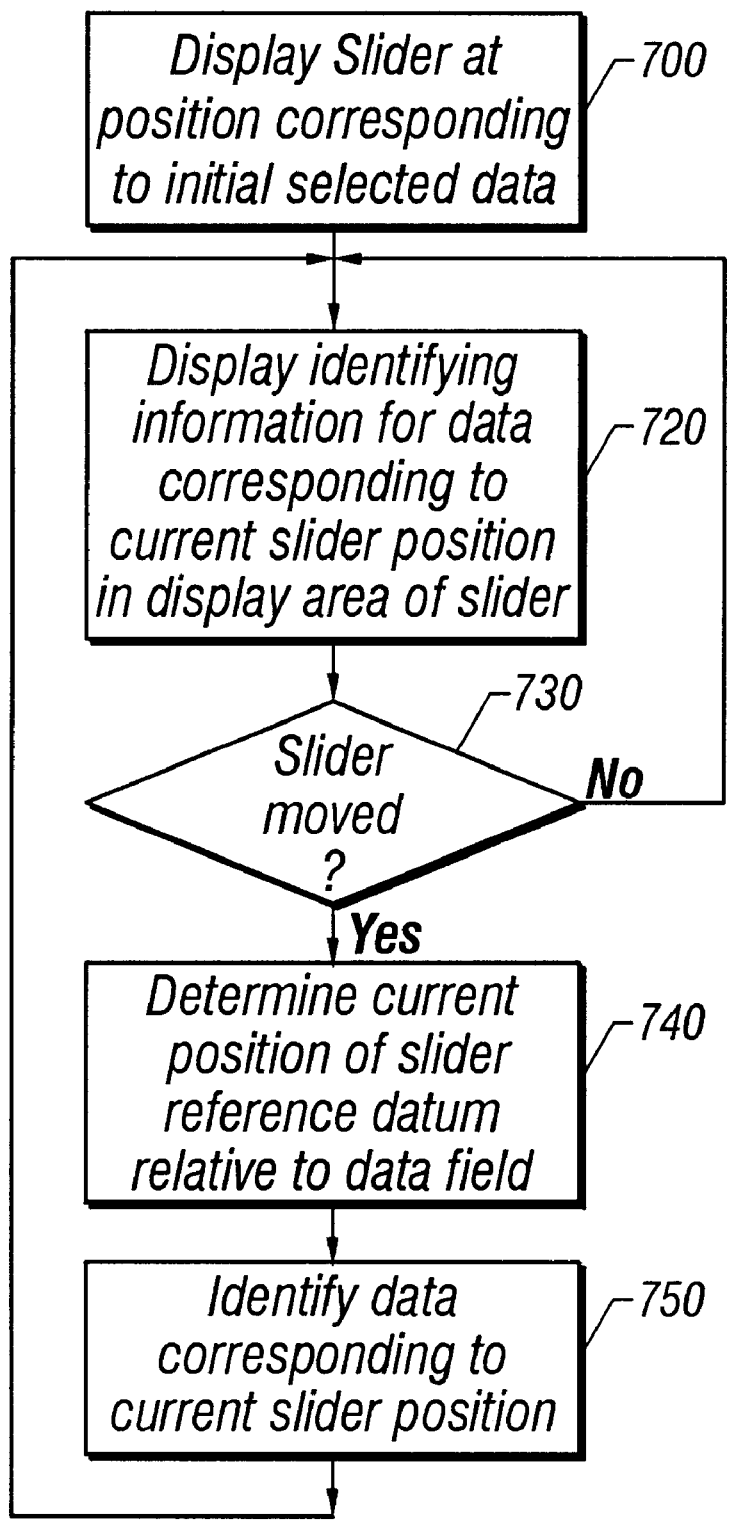
FIG. 7 is a flow chart showing the operation of one or more embodiments of the invention.

FIG. 7 shows a flow chart of a process used in one or more embodiments of the invention. In the embodiment of FIG. 7, a slider of the invention is initially displayed at step 700 with respect to a displayed graphical representation of a set of available data at a position that corresponds to the initially selected data from a set of data represented by the graphical representation. The initially selected data by be predetermined default initial data, may be the result of previous user action, or may be determined in some other manner. For example, in a drawing program using the embodiment of FIG. 3, a user may wish to change the color of a screen object from a current color to a new color. To do so, the user selects the object, for example by clicking on the object using a pointing device such as a mouse, and inputs a "change color" command, for example by clicking on an appropriate icon or choosing an appropriate option from a pull-down menu. In response, color palette 300 is displayed, with slider 310 positioned such that its center is situated over the color in color palette 300 that constitutes the current color of the object whose color the user wants to change. The current color is thus the initially selected color that determines the initial position of the slider at step 700.

At step 720, information identifying the data that corresponds to the current slider position relative to the graphical representation of the underlying data is displayed in the display area of the slider. For example, for the embodiment of FIG. 3, the identifying information displayed is a swatch of the currently selected color, and for the embodiment of FIG. 4, the identifying information displayed is the page number that corresponds to the current slider position.

At step 730, a determination is made as to whether the slider has moved. If the slider has not moved, processing returns to step 720, and the information displayed in the display area remains unchanged.

If the slider has moved, processing proceeds to step 740. At step 740, the current position of the reference datum associated with the slider is determined relative to the graphical representation of data. At step 750, the data corresponding to the current slider position (e.g. the color for the embodiment of FIG. 3, page position for the embodiment of FIG. 4, or line thickness for the embodiment of FIG. 5) is identified based on the current position of the reference datum. From step 750, processing proceeds to step 720, where new identifying information for the data corresponding to the current slider position is displayed in the display area of the slider.

Figure 8:
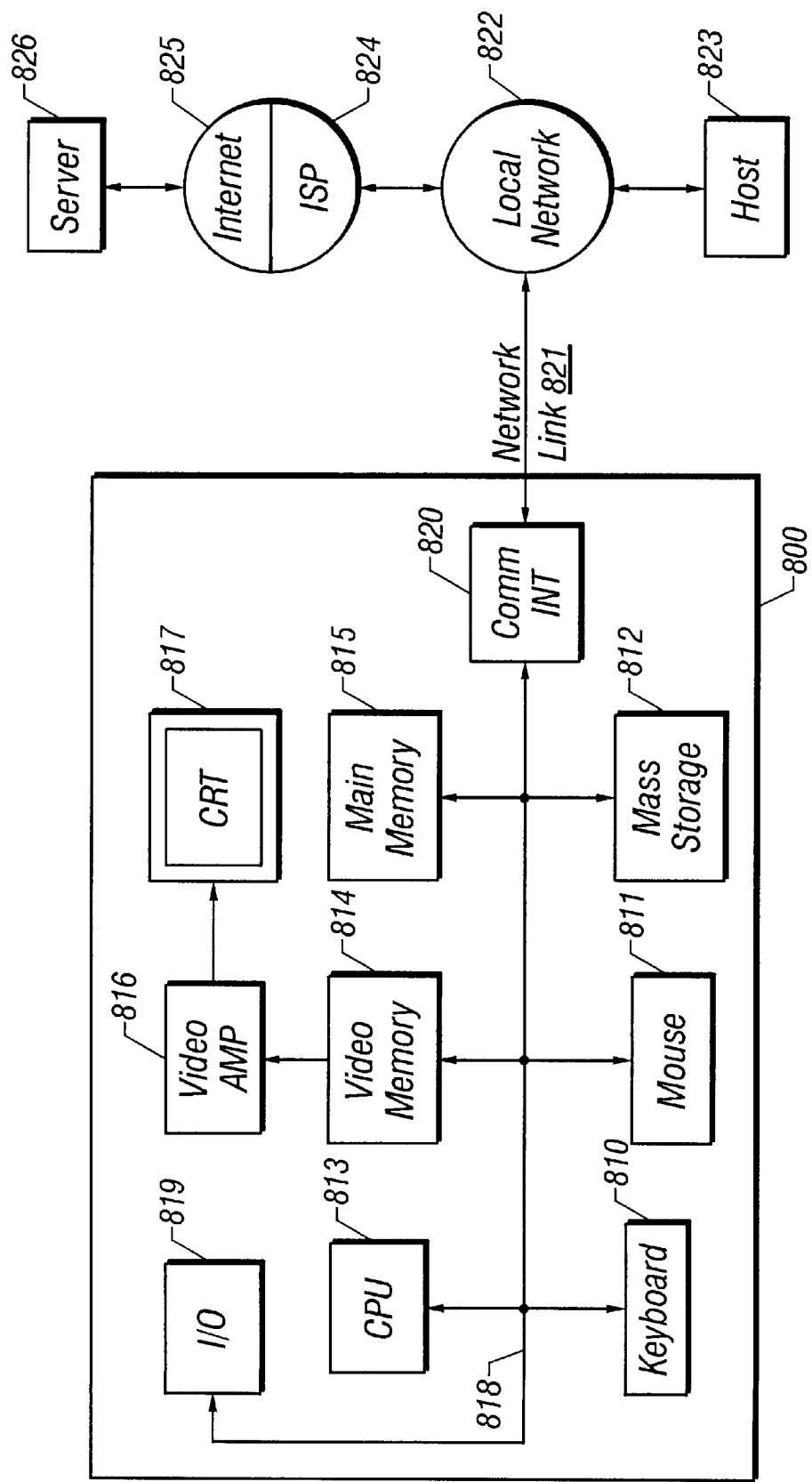
FIG. 8 is an example of a computer system that can be used to implement one or more embodiments of the invention.

One or more embodiments of the invention can be implemented as computer software in the form of computer readable code executed on a general purpose computer such as computer 800 illustrated in FIG. 8, or in the form of bytecode class files executable within a Java™ runtime environment running on such a computer. A keyboard 810 and mouse 811 are coupled to a bi-directional system bus 818. The keyboard and mouse are for introducing user input to the computer system and communicating that user input to processor 813. Other suitable input devices may be used in addition to, or in place of, mouse 811 and keyboard 810. I/O (input/output) unit 819 coupled to bi-directional system bus 818 represents such I/O elements as a printer, A/V (audio/video) I/O, etc.

Computer 800 includes a video memory 814, main memory 815 and mass storage 812, all coupled to bidirectional system bus 818 along with keyboard 810, mouse 811 and processor 813. Mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 32-bit data bus for transferring data between and among the components, such as processor 813, main memory 815, video memory 814 and mass storage 812. Alternatively, multiplex data/address lines may be used instead of separate data and address lines.

In one embodiment of the invention, the processor 813 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 815 is comprised of dynamic random access memory (DRAM). Video memory 814 is a dual-ported video random access memory. One port of the video memory 814 is coupled to video amplifier 816. Video amplifier 816 is used to drive the cathode ray tube (CRT) raster monitor 817. Video amplifier 816 is well known in the art and may be implemented by any suitable apparatus. This circuitry converts pixel data stored in video memory 814, which may, for example, include pixel data representing one or more embodiments of the sliders and data fields of the invention, to a raster signal suitable for use by monitor 817. Monitor 817 is a type of monitor suitable for displaying graphic images.

Computer 800 may also include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to local server computer 823 or to data equipment operated by an Internet Service Provider (ISP) 824. ISP 824 in turn provides data communication services through the world wide packet data communication network now commonly referred to as the "Internet" 825. Local network 822 and Internet 825 both use electrical, electromagnetic or optical signals which carry digital data streams. The signals through the various networks and the signals on network link 821 and through communication interface 820, which carry the digital data to and from computer 800, are exemplary forms of carrier waves transporting the information.

Computer 800 can send messages and receive data, including program code, through the network(s), network link 821, and communication interface 820. In the Internet example, remote server computer 826 might transmit a requested code for an application program through Internet 825, ISP 824, local network 822 and communication interface 820. In accord with the invention, one such downloaded application is an application that implements the method of selecting data described herein.

The received code may be executed by processor 813 as it is received, and/or stored in mass storage 812, or other non-volatile storage for later execution. In this manner, computer 800 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment comprising a display means, including appliances and electronic devices using embedded processors and controllers and LCD displays.

Thus, a method and apparatus for graphically selecting data has been presented. Although the present invention has been described with respect to certain example embodiments, it will be apparent to those skilled in the art that the present invention is not limited to these specific embodiments. Further, although the operation of certain embodiments has been described in detail using certain detailed process steps, some of the steps may be omitted or other similar steps may be substituted without departing from the scope of the invention. Other embodiments incorporating the inventive features of the present invention will be apparent to those skilled in the art. The invention is defined by the claims and their full scope of equivalents.

What is claimed is:

1. A method for selecting data from a set of data comprising:

associating a display screen with data from said set of data;

displaying on said display screen a moveable graphic object comprising a reference datum and a display area within said graphic object;

moving said graphic object within said display screen, wherein said graphic object is moveable in more than one direction within said display screen; and displaying in said display area a subset of said set of data associated only with a current position of said reference datum on said display screen, wherein said subset of said set of data displayed in said display area changes to reflect the data at a current position of said reference datum on said display screen as said graphic object moves from a first position to a second position within said display screen.

2. The method of claim 1 wherein said moving said graphic object is in response to a user action.

3. The method of claim 1 wherein said graphic object comprises displaying a visible representation of said reference datum on said display screen.

4. The method of claim 1 wherein said graphic object is moveable in more than one dimension.

5. The method of claim 1 wherein said graphic object comprises a slider.

6. The method of claim 1 wherein said data in said set of configuration data comprises parameters of a screen object.

7. The method of claim 6 wherein said data in said set of configuration data comprises color data.

8. The method of claim 7 wherein said subset of said set of data comprises color data.

9. The method of claim 6 wherein said data in said set of configuration data comprises line thickness data.

10. The method of claim 9 wherein said subset of said set of data comprises line thickness data.

11. The method of claim 1 wherein said data in said set of configuration data comprises document data.

12. The method of claim 1 further comprising displaying a graphical representation related to said set of configuration data on said display screen.

13. A computer program product comprising:

a computer processor usable medium having computer processor readable program code embodied therein for selecting data from a set of data, said computer processor readable program code comprising:

computer processor readable program code configured to cause a computer processor to associate a display screen with data from said set of data;

computer processor readable program code configured to cause a computer processor to display on said display screen a moveable graphic object, said graphic object comprising a reference datum and a display area within said graphic object;

computer processor readable program code configured to cause a computer processor to move said graphic object within said display screen, wherein said graphic object is moveable in more than one direction within said display screen; and computer processor readable program code configured to cause a computer processor to display in said display area a subset of said set of data associated only with a position of said reference datum on said display screen, wherein said display changes to reflect the subset of said set of data at a current position of said reference datum on said display screen as said graphic object moves from a first position to a second position within said display screen.

14. The computer program product of claim 13 further comprising computer processor readable program code configured to cause a computer processor to move said graphic object in response to user action.

15. The computer program product of claim 13 further comprising computer processor readable program code configured to cause a computer processor to display a visible representation of a reference datum associated with said graphic object on said display screen.

16. The computer program product of claim 13 wherein said graphic object is movable in more than one dimension.

17. The computer program product of claim 13 wherein said graphic object comprises a slider.

18. The computer program product of claim 13 wherein said data in said set of configuration data comprises parameters of a screen object.

19. The computer program product of claim 18 wherein said data in said set of configuration data comprises color data.

20. The computer program product of claim 19 wherein said subset of said set of data comprises color data.

21. The computer program product of claim 18 wherein said data in said set of configuration data comprises line thickness data.

22. The computer program product of claim 21 wherein said subset of said set of data comprises line thickness data.

23. The computer program product of claim 13 wherein said data in said set of configuration data comprises document data.

24. The computer program product of claim 13 further comprising computer processor readable program code configured to cause a computer processor to display a graphical representation related to said set of configuration data on said display screen.

25. A graphical user interface displayed on the display screen of a computer processor equipped appliance comprising:

a moveable graphic object, said graphic object comprising a reference datum and a display area within said graphic object, said graphic object moveable in more than one direction within said display screen from a first position to a second position, said display area displaying a subset of a set of data associated only with a current position of said reference datum on said display screen as said graphic object moves within said display screen, such that said subset of data displayed on said display area when said reference datum is in said first position is the data associated with said first position and the subset of data displayed on said display area when said reference datum is in said second position is the data associated with said second position.

26. The graphical user interface of claim 25 wherein said graphic object is movable in more than one dimension.

27. The graphical user interface of claim 25 wherein said graphic object comprises a sliding control button.

28. The graphical user interface of claim 25 further comprising a graphical representation related to said set of configuration data.

29. The graphical user interface of claim 28 wherein said graphical representation comprises a color palette.

30. The graphical user interface of claim 28 wherein said graphical representation comprises a scroll bar.

31. The graphical user interface of claim 25 wherein said set of configuration data comprises parameters of a screen object.

32. The graphical user interface of claim 25 wherein said set of configuration data comprises configuration data.

33. The graphical user interface of claim 25 wherein said set of configuration data comprises document data.

34. A video memory of a computer processor equipped appliance comprising:
pixel data representing a movable graphic object, said graphic object comprising a reference datum and a display area within said graphic object, said pixel data representing said display area comprising pixel data representing a subset of a set of data associated only with a current position of said reference datum on a display screen of said appliance, said graphic object moveable in more than one direction within said display screen from a first position to a second position, and said subset of said set of data changes to reflect a current position of said reference datum as said graphic object moves within said display screen, such that said subset of data displayed on said display area when said reference datum is in said first position is the data associated with said first position and the subset of data displayed on said display area when said reference datum is in said second position is the data associated with said second position.

35. The video memory of claim 34 further comprising pixel data representing a graphical representation relating to said set of configuration data.

36. The video memory of claim 34 further comprising pixel data representing a reference datum associated with said graphic object.

37. The video memory of claim 34 wherein said graphic object comprises a slider.

38. The video memory of claim 35 wherein said graphical representation comprises a color palette.

39. The video memory of claim 35 wherein said graphical representation comprises a scroll bar.

40. The video memory of claim 34 wherein said set of configuration data comprises parameters of a screen object.

41. The video memory of claim 34 wherein said set of configuration data comprises configuration data.

42. The video memory of claim 34 wherein said set of configuration data comprises document data.

43. The video memory of claim 36 wherein said reference datum comprises a central point of said graphic object.

44. The video memory of claim 36 wherein said pixel data representing said reference datum is located in a portion of said video memory separate from a portion of said video memory in which said pixel data representing said graphic object is located.

45. A computer program product comprising:
a computer usable medium having computer readable program code embodied therein for selecting a color value from a display region, said computer readable program code configured to cause a computer to:
display on said display screen a moveable graphic object, said graphic object comprising a reference datum and a display area within said graphic object;
move said graphic object from a first position to a second position within said display screen in response to user actions, wherein said graphic object is moveable in more than one direction within said display screen; and
display in said display area only the color associated with a current position of said reference datum on said display screen, wherein said display in said display area changes to reflect the color at said reference datum as said graphic object moves within said display screen, such that the color displayed in said display area in a first position of said reference datum changes to reflect the color associated with a second position of said reference datum as said reference datum moves from said first position to said second position.

* * * * *